July 23, 1946.  A. O. ROCHE, JR  2,404,596
TEMPERATURE CONTROLLER
Filed April 10, 1943
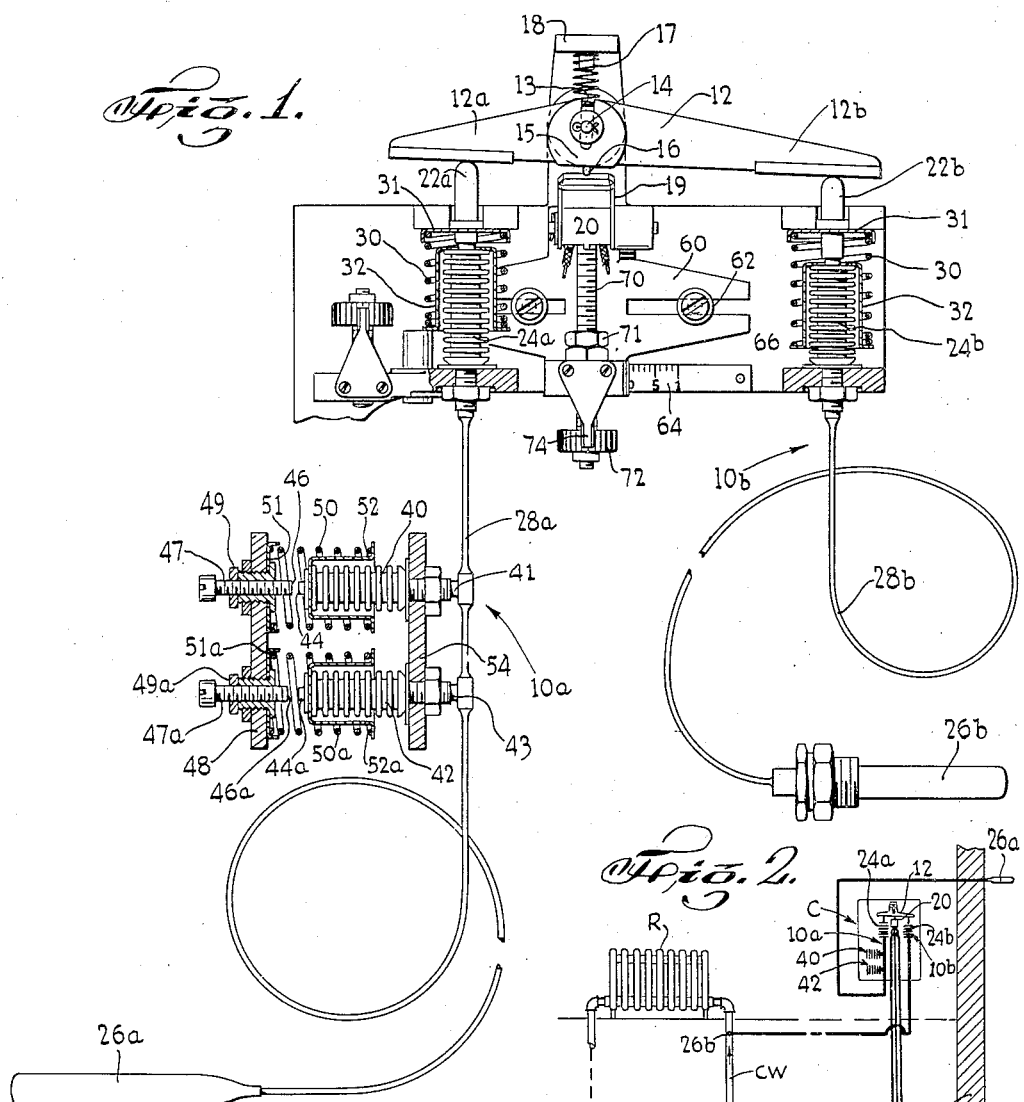
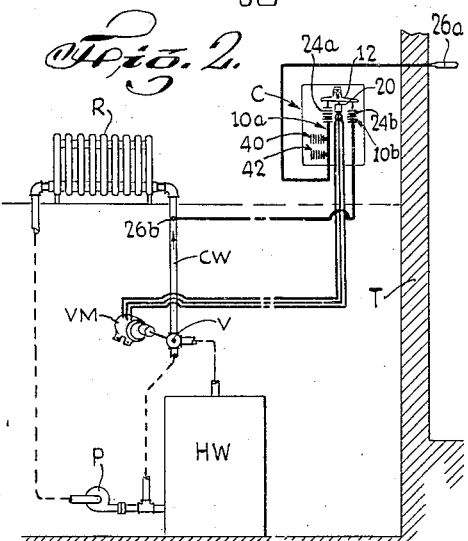
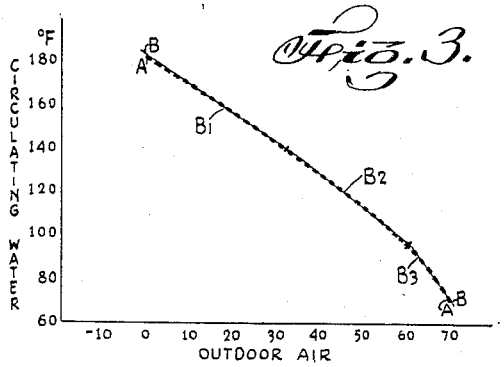
INVENTOR.
AUSTIN O. ROCHE, JR.
BY Hammond & Littell
ATTORNEYS

Patented July 23, 1946

2,404,596

UNITED STATES PATENT OFFICE 2,404,596

TEMPERATURE CONTROLLER

Austin O. Roche, Jr., Indianapolis, Ind., assignor to Hoffman Specialty Co., Indianapolis, Ind., a corporation of Illinois Application April 10, 1943, Serial No. 482,527

6 Claims. (Cl. 236—91)

This invention relates to temperature controllers and to systems using the same to control one temperature in a predetermined relation to variations in another, commonly for the regulation of a third temperature affected by such variations. The invention has many applications and is advantageous, for example, for the control of hot water heating systems or cooling systems for homes or other buildings where it is desired to keep room temperatures approximately constant under changing weather conditions.

Temperature controllers have been provided heretofore which embody lever means movable to control the temperature of a heating fluid according to the varying positions of two thermally responsive expansion devices. In applying such controllers to hot water heating systems, the bulbs of two expansion devices are located, respectively, in the circulating hot water and in the air outside the enclosure being heated. The expansion devices work oppositely against arms of the controller lever and cause it, by certain movements, to operate a valve control switch or other means to change the temperature of the circulating water. The lever arms have a fixed operating ratio that establishes a straight line ratio between changes in the temperature of the outdoor air and the controlled temperature changes in the circulating water.

If this lever arm ratio has been selected properly for a certain outdoor temperature and other use conditions, the controller will function at that temperature to control the circulating water so that it emits enough heat to counteract heat losses and keep the room temperature approximately uniform. On the other hand, when the outdoor temperature changes the water temperature changes according to the fixed ratio, and the heat emission of the system then may not balance the heat loss. This unbalanced condition occurs in practice because, although the heat loss may vary directly as the difference between the outdoor temperature and the room temperature, the actual heat emission from such a system varies as an exponential or curvilinear function of the temperature of the heating medium, rather than in a fixed ratio thereto. The equation for determining this curvilinear relationship, in the case of hot water radiator systems, is set forth on pages 263-265 of the Heating Ventilating Air Conditioning Guide (1942), published by The American Society of Heating and Ventilating Engineers.

For the reason stated, it has not been possible with known means to keep a hot water heating system operating at water temperatures so varied in relation to outdoor temperatures that the heat emission at all times would be approximately equal to the heat loss theoretically occurring to the outdoor air. Controllers of the type described have been designed to approach this result at the most prevalent outdoor temperatures, but the controlled water temperatures in such cases may not be high enough in colder weather, and may be too high in warmer weather, to keep room temperatures uniform.

The main object of this invention is to provide new and improved temperature controllers and heat exchange systems using the same which are operative, for example, to control the temperature of a heating fluid so as to keep the heat emission of a heating system at all times approximately equal to the heat requirements as measured by a variable temperature, such as that of the outdoor air, which is used as the basis for control. My invention thus contemplates heating systems which will keep room temperatures approximately constant under changing weather conditions. It also contemplates cooling systems operative to counteract heat gains by equivalent cooling effects over a wide range of outdoor or other control temperatures.

The temperature controllers herein provided utilize lever means or the like to regulate the temperature of a heat exchange medium according to the positions of two thermally responsive expansion devices, one responsive to the heat exchange medium and another to a control medium of variable temperature; but according to my invention I combine the lever means and the expansion devices for coaction through means which automatically change the ratio of temperature variations in the two media in a predetermined manner as the control temperatures traverse a predetermined range. For example, I may construct either expansion device so that it imparts different predetermined changes of position to the lever means, per degree of temperature change affecting the device, at different temperatures in the control temperature range; or the lever part or parts coacting with one or more of the expansion devices may be constructed with means to give the same effect.

In substance, therefore, I provide a controller which embodies mechanism for automatically changing the effective lever arm ratio through which temperature-induced movements of an expansion device are translated into temperature changes—i. e., a predetermined non-uniform or exponential relationship is established between changes in the controlled temperature and changes in the temperature used as the basis for control. For any heat exchange system using the invention, this ratio-changing mechanism may be designed to maintain such a relationship between the controlled and the basic temperatures as will correspond approximately to a determined curvilinear relationship, for the system in question, between variations of the controlled temperature and the heat actually exchanged by the system. In this way, where the water temperature in a hot water heating system is to be controlled and the temperature of outdoor air is used as the basis for control, my invention may be applied to keep the heat emission of the system approximately equal to the calculated or experimentally determined heat requirements for all outdoor temperatures, and so to keep room temperatures more nearly uniform under changing weather conditions than has been possible heretofore.

Another feature of my invention is that it provides a temperature controller of the type described which can be set at different positions to select the basic temperature or temperatures at which changes in the ratio of basic to controlled temperature variations will take place. This feature makes it possible to set a certain controller for any of various use conditions, without the necessity of substituting differently designed parts for each application.

Other objects, features and advantages of my invention will become apparent from the following detailed description of a preferred embodiment thereof, when considered in connection with the accompanying drawing wherein, Figure 1 is a diagrammatic assembly view, partly in section, of a temperature regulator embodying my invention;

Figure 2 is a diagram of a heating system embodying the invention, of the continuously circulating hot water radiator type; and Figure 3 is a chart depicting a theoretical heat emission curve for such a system and also indicating a relationship between the circulating water temperature and the outdoor air temperature affecting such a system, such as may be maintained with the embodiment shown.

In the drawing I illustrate the invention in a simple embodiment using a number of structures and operations disclosed in United States Patent No. 2,297,706, granted on an invention of Ferdinand Jehle and myself. It will be understood that the new features herein disclosed and defined in the appended claims may be embodied in various other forms and arrangements of apparatus without restriction to the details of this illustrative form.

As seen in Figure 1, the temperature controller itself comprises a lever element 12 having oppositely extended arms 12a and 12b and mounted for pivotal and also vertical movement with respect to a relatively stationary pin 14, which serves as a fulcrum. A part 15 of the lever is adapted to engage and depress movable element 16 of an underlying switch member 20 in certain lever positions. A spring 17 seated on flange 18 of a mounting bracket 19 urges the lever toward a switch-engaging position. The lever position at any time is determined by the relative positions of two extension elements 22a and 22b, which are variably positioned parts of two thermally responsive expansion devices 10a and 10b, respectively. These extension elements work against the opposite lever arms 12a and 12b so as to hold the lever part 15 raised away from the switch element 16 under certain relative temperature conditions affecting the two expansion devices, but they allow the lever to engage and actuate the switch under other relative temperature conditions.

The extension elements 22a and 22b are operated, respectively, by bellows 24a and 24b which are connected, respectively, with thermo-sensitive elements, such as the bulbs 26a and 26b, through capillary tubes 28a and 28b containing an expansible fluid that fills the bulb, the bellows and the tube of each expansion device. A spring 30 resting upon a relatively stationary base 31 exerts a definite resistance against the expansion of each operating bellows by pressing against a flanged cap 32 carried by each of such bellows.

The bulb 26a may be located in a medium of variable temperature which is to be utilized as the basis for temperature control, and bulb 26b may be located in another medium the temperature of which is to be kept in a certain relation to the basic temperature by means of the temperature controller. In such a case the switch 20 is connected as a part of suitable means for changing or regulating the controlled temperature. For example, in Figure 2 the controller is indicated at C as part of an improved hot water radiator heating system for heating space inside a building or enclosure T. Bulb 26a is there located in the outdoor air; bulb 26b is located in the circulating water inside a pipe CW, through which heating water may be circulated continuously to radiators, such as diagramed at R, by means of a pump P; and the contacts of the controller switch 20 are connected in any suitable electrical circuit to temperature changing means such as a valve motor VM arranged to actuate a valve V and thus control the proportion of circulating water passed through a hot water makeup tank HW into the water line CW and the proportion by-passed from the pump P directly into CW.

From the foregoing it will be evident that when the temperature affecting bulb 26a falls below a certain point in relation to the temperature affecting bulb 26b, or vice versa, the expansion fluid of the corresponding expansion device will contract and by so doing cause the corresponding extension element 22a, or 22b, to recede away from its lever arm 12a, or 12b, whereupon the lever part 15 may engage and move the switch element 16. Whenever this happens the controlled temperature may be automatically increased, such as by the valve motor VM acting to start or increase the supply of hot water from HW through V into the circulating water in CW. As the controlled temperature increases, however, the fluid in bulb 26b responds to the temperature change so as to expand the operating bellows 24b and extend element 22b and raise or otherwise displace the lever arm 12b. This action will continue until part 15 has been moved away from the switch point 16, whereupon certain switch contacts may be opened by suitable means, such as a spring (not shown) in switch 20, and other switch contacts, if needed, may be closed to reverse the action of the motor VM. Increases of the controlled temperature then will be automatically discontinued until an unbalanced temperature relationship exists again, due either to a loss of heat from the medium affecting bulb 26b or to a lowering of the basic temperature affecting bulb 26a. Instead of a reversing motor VM and valve V, the flow of hot water into the system may be controlled by a valve such as shown at 29 in Figure 7 of the patent to M. C. Gillett et al. No. 2,181,480.

In this way a definite relationship between the basic and the controlled temperatures may be automatically maintained over a wide range of temperature variations in a control medium, such as the air outside the enclosure T; but without further provisions the ratio of the two temperature variations is a more or less fixed ratio over the entire range and is determined in effect by the relative lengths of the lever arms 12a and 12b. Pursuant hereto I make further provisions in the combination for automatically changing this ratio in a predetermined manner by constructing the controller with means which effectuate predetermined changes in the incremental movements or position changes imparted to either or both of the controller lever arms by the corresponding expansion device, per degree of temperature variation affecting the device, as the basic temperatures traverse a predetermined normal range. In the illustrated form these means are provided by a special construction of the expansion device 10a, but a similar effect may be secured by providing equivalent differential motion-transmitting mechanism of predeterminable action anywhere in the trains between the thermo-sensitive elements and the controller lever mechanism.

As shown in Figure 1, the device 10a comprises not only the operating bellows 24a but also one or more additional bellows, such as the two bellows 40 and 42, which are filled with the same fluid as the operating bellows and are connected with it in a common fluid system through the tube sections 41 and 43 joined to the main tube 28a. Bellows 40 carries an extension element 44 in axial alignment with a relatively fixed abutment or stop 46, which preferably is adjustably positioned such as by being provided at the end of a set screw 47 that extends through a support 48 and can be held in any selected position by a lock nut 49. A spring 50 resting on a base 51 presses against a flanged cap 52 embracing bellows 40, and this spring urges the bellows toward a fixed support 54 with a predetermined force that yields in response to expansions induced by temperature changes at the bulb 26a. Bellows 42 works with parts which correspond to those of bellows 40 and are indicated in the drawing by corresponding numbers bearing the suffix a; e. g., the two extension elements are numbered 44 and 44a, respectively.

It will now be evident that the stops 46 and 46a may be set so as to allow any desired predetermined extent of movement of the respective bellows and extension elements, and that the parts may be designed and set so that this movement of each bellows will take place in a certain predetermined portion of the total range of temperatures that may affect the bulb 26a in the use of the controller. When the extension element 44 or 44a reaches its stop further expansion of the corresponding bellows is prevented. The springs 30, 50 and 50a impose substantially the same resistance to expansion of all three bellows 24a, 40 and 42.

Therefore, when the basic temperature affecting bulb 26a is near one of the limits of its range any temperature change that occurs will cause movements in all three bellows proportionate to their respective volumes. The movement of the operating bellows 24a and lever arm 12a per degree of temperature change, and hence the ratio of basic temperature variations to controlled temperature variations, will be at a minimum under that condition.

When the basic temperature has increased to a certain point in its range, one of the additional bellows, bellows 40 for example, may reach the limit of its movement as determined by the setting of stop 46, and at basic temperatures above that point the expansion of the fluid in the system will be accompanied by changes in the position of only two bellows instead of three. While the basic temperature traverses this second portion of its range the movement of the operating bellows 24a and lever arm 12a per degree of temperature change therefore will be greater than at first, and the ratio of controlled temperature changes to basic temperature changes will be correspondingly increased.

Finally, bellows 42 may reach the limit of its movement when the basic temperature has further increased to another predetermined point that has been selected by the setting of stop 46a, and any further temperature-induced fluid expansions occurring after that will be accompanied by movements of the operating bellows alone. Thus a maximum ratio of controlled temperature variations to basic temperature variations may be attained in a third portion of the basic temperature range.

It will be seen that the movement of the separate bellows 24a, 40 and 42 depends on the ratio of their separate volumes to that of bulb 26a. When either of the bellows is stopped from moving the remaining ones must then move more per degree of temperature rise of bulb 26a. If both bellows, 40 and 42, are stopped from expanding, such as in the case when they contact their stops 46 and 46a, then the bellows 24a must expand still more per degree of temperature change affecting bulb 26a and as a result 22a imparts a still greater movement to arm 12a. For example, should bellows 40 and 42 have a volume equal to that of bulb 26a, then the movement of element 22a will be only one third as great per degree of temperature change in the outside atmosphere when both bellows 40 and 42 are operating as when they have both reached their stops. Likewise, when one of the bellows has reached its stop the movement of element 22a will be only one half as much as when both bellows have reached their stop. By varying the relative volume of the bellows and the position of their stops other relative movements of the element 22a may be procured.

Within the limitations imposed by the characteristics of the expansion fluid, one or a plurality of two or more additional bellows may be provided in coordination with an operating bellows to secure as many automatic variations of the temperature ratio as may be desired for normal applications of the controller, such as to make the actual heat emission of a heating system like that of Figure 2 correspond closely to the heat emission theoretically determined as necessary to keep room temperatures uniform over a normal range of outdoor temperatures. The ratio maintained by the controller in each predetermined portion of the basic temperature range may be selected by appropriate designing of the several bellows, the lever arms, etc. To secure further flexibility in the setting of a given controller for desired ratios of temperature variations, means may be provided, as disclosed in the aforesaid Patent No. 2,297,706, for adjusting the location of the lever means 12 laterally with respect to the extension elements 22a and 22b so as to increase or reduce the lengths of the respective lever arms 12a and 12b. For example, the bracket 19, which carries the lever means and switch 20, may be mounted for lateral adjustment by means of horizontally slotted tongues 60 cooperating with fastening screws 62. The lever arm ratio existing at any bracket setting may be conveniently indicated by a dial 64 affixed to a mounting plate 66 upon which the bracket 19, as well as the operating bellows 24a and 24b and their cooperating parts, are mounted.

The actual temperature condition to be established by the controller may be selected, as further disclosed in said Patent No. 2,297,706, by appropriate vertical positioning of the switch element 16 with respect to lever part 15. This may be accomplished by a screw 70 which carries switch 20 at its upper end, which can be locked in a certain position by a nut 71, and which has a knob 72 at its lower end for turning the screw when the nut is loose. Suitable indicia on this knob are so related to a pointer 74 as to indicate the temperature condition to be established by each switch setting. The higher the position of switch element 16 the greater will be the controlled temperature which prevails at any given basic temperature.

By means of a temperature controller such as above described, the ratio of basic temperature variations to controlled temperature variations may be automatically varied over a wide range of basic temperatures in approximate conformity to a given exponential relationship between variations of the controlled temperature and, for example, the heat emission of a heating system of the type diagramed in Figure 2. In this way the heat emission from the radiator R, at any outdoor temperature affecting bulb 26a, may be kept approximately in balance with the heat loss from the enclosure T at the same outdoor temperature, thereby keeping the temperature inside the enclosure substantially uniform. This result is secured not only at the most prevalent temperatures in the outdoor range but also at relatively low and relatively high temperatures in the outdoor range.

A typical condition maintainable with the illustrated system is represented diagrammatically by the chart in Figure 3, wherein the dash line curve A—A represents the theoretical relationship between the circulating water temperature and the outdoor air temperature needed to make the radiator heat emission balance the heat loss from the enclosure at outdoor temperatures between 0° F. and 70° F.; and the thin line B—B represents an actual relationship between the circulating water temperature and the outdoor air temperature such as may be maintained in the system at a certain controller setting. The line B—B is composed of a series of three straight lines B—1, B—2 and B—3 which closely approach the theoretical heat emission curve. The first portion B—1 indicates a relatively low ratio of circulating water temperature variation to outdoor temperature variation, at relatively low outdoor temperatures; portion B—2 indicates a somewhat higher ratio that is established automatically at certain outdoor temperatures intermediate the upper and lower limits of the outdoor range; and portion B—3 indicates a maximum ratio that is established at certain relatively high outdoor temperatures. Thus the heat emission of the system is kept approximately equal to the heat losses under all outdoor temperature conditions.

It will be understood that the slope changes represented by the portions B—1, B—2 and B—3 of line B—B may be made to occur at various outdoor temperatures, by appropriate adjustments of the set screws 47 and 47a which carry the stops 46 and 46a. In this way, a controller of given design may be adapted for use in different heating or cooling systems involving different heat emission curves, without the necessity of changing any of the controller parts.

The invention herein disclosed is not restricted to the details hereinabove set forth and should be accorded a scope commensurate with its novel contributions to the art, which are intended to be defined by the appended claims.

I claim:

1. In a heating system using a circulating fluid to counteract heat exchange between an enclosure and the outside air, control means comprising a thermostat responsive to the temperature of the circulating fluid and a thermostat responsive to the temperature of the outside air, means responsive to the conjoint action of said thermostats to control the heat supplied to said circulating fluid, and a means connected to one of said thermostats to automatically vary the rate of operation of said thermostat in different ranges of temperature at said thermostat.

2. In a heating system using a circulating fluid to counteract heat exchange between an enclosure and the outside air, control means comprising a thermostat responsive to the temperature of the circulating fluid and a thermostat responsive to the temperature of the outside air, means responsive to the conjoint action of said thermostats to control the heat supplied to said circulating fluid, and means having a limited movement connected to one of said thermostats to automatically vary the rate of operation of said thermostat in different ranges of temperature at said thermostat.

3. A heating system using a circulating fluid to counteract heat exchange between an enclosure and the outside air, control means comprising an expansible fluid thermostat responsive to the temperature of the circulating fluid, a second expansible fluid thermostat responsive to the temperature of the outside air, means responsive to the conjoint action of said thermostats to control the heat supplied to said circulating fluid, and an expansible chamber having limited movement connected to the fluid system of one of said thermostats to automatically vary the rate of operation of said thermostat in different ranges of temperature at said thermostat.

4. A heating system using a circulating fluid to counteract heat exchange between an enclosure and the outside air, control means comprising an expansible fluid thermostat responsive to the temperature of the circulating fluid, a second expansible fluid thermostat responsive to the temperature of the outside air, means responsive to the conjoint action of said thermostats to control the heat supplied to said circulating fluid, and a plurality of expansible chambers having limited movements connected to the fluid system of one of said thermostats to automatically vary the rate of operation of said thermostat in different ranges of temperature at said thermostat.

5. In a temperature controller, means for changing a temperature to be controlled, lever means moveable to control the action of said temperature changing means, means for communicating motion to said lever means comprising bulbs respectively subjected to the temperature variations in a controlling medium and a controlled medium connected to thermal expansion devices containing an extension element to engage the lever means, a plurality of expansion devices being connected to at least one of the bulbs, an expansible fluid common to said plurality of expansion devices and its connected bulb to translate temperature changes at the bulb into movement of the expansion devices including means for limiting said additional expansion devices to a predetermined travel so as to change the movement of said extension element per degree of temperature change at a predetermined point in the course of such temperature variations.

6. A temperature controller as described in claim 5, and means for varying the setting of said limiting means so as to vary the temperature predetermined for the change of movement of said operating bellows.

AUSTIN O. ROCHE, Jr.